United States Patent [19]

Schmierer

[11] Patent Number: 4,894,639

[45] Date of Patent: Jan. 16, 1990

[54] PRESSURE SWITCH FOR MONITORING TIRE PRESSURE, PARTICULARLY OF MOTOR VEHICLE TIRES

[75] Inventor: Wolfgang Schmierer, Pforzheim, Fed. Rep. of Germany

[73] Assignee: Dr. Ing. h.c.F. Prosche AG, Weissach, Fed. Rep. of Germany

[21] Appl. No.: 328,541

[22] Filed: Mar. 24, 1989

[30] Foreign Application Priority Data

Mar. 30, 1988 [DE] Fed. Rep. of Germany ....... 3810763

[51] Int. Cl.⁴ ............................................. B60C 23/00
[52] U.S. Cl. .................................... 340/444; 340/442; 200/61.22; 200/80 R; 200/83 B; 200/83 N; 116/34 R; 73/146.5
[58] Field of Search ............... 340/444, 442; 73/146.5, 73/146; 116/34 R, 34 A, 34 B; 200/61.22, 61.25, 61.45 R, 80 R, 83 R, 83 B, 83 N

[56] References Cited

U.S. PATENT DOCUMENTS 3,760,350  9/1973  Johnson .............................. 73/146.5
4,229,728 10/1980  Tremba .............................. 73/146.5

FOREIGN PATENT DOCUMENTS 3543864  6/1987  Fed. Rep. of Germany .

Primary Examiner—Donnie L. Crosland

[57] ABSTRACT

A pressure switch for monitoring a tire pressure of a motor vehicle tire is fastened to a wheel rim and is actuated by the inflating pressure in the tire. The pressure switch comprises a reference pressure chamber which is sealed off by an electrically conductive switching diaphragm in the direction of the tire, and carries a contact pin interacting with this diaphragm. The switching diaphragm has a mass which is controlled as a function of centrifugal force in response to tire rotation such that the switching point of the pressure switch can be changed automatically as a function of vehicle speed.

20 Claims, 2 Drawing Sheets

PRESSURE SWITCH FOR MONITORING TIRE PRESSURE, PARTICULARLY OF MOTOR VEHICLE TIRES

BACKGROUND AND SUMMARY OF THE INVENTION

The invention relates to a pressure switch for monitoring tire pressure of motor vehicle tires, which is fastened at a wheel rim of a vehicle tire and is actuated by inflating pressure in the tire. The switch comprises a reference pressure chamber which is sealed off by an electrically conductive switching diaphragm facing in the direction of the tire. The chamber carries a contact pin interacting with this switching diaphragm, to close an electrical circuit in response to tire pressure and vehicle speed.

A tire pressure sensor for monitoring tire pressure is known from German Patent Application No. DE-OS 35 43 864, and comprises a pressure switch with a reference pressure chamber. The switch is sealed off in the direction of the tire interior, by an electrically conductive switching diaphragm and includes a contact pin which interacts with this diaphragm. When the pin is in contact with the switching diaphragm, a specified operating pressure has been reached in the vehicle tire. Such a pressure switch can be designed for only one switching pressure actuation Point, regardless of the speed range of the vehicle; i.e., the single pressure switch can monitor only one inflating pressure either at high or low vehicle speeds.

It is the object of the invention to provide a pressure switch for monitoring tire pressure of motor vehicle tires, which is fastened at a wheel rim of a vehicle tire and is actuated by inflating pressure in the tire. The switch comprises a reference pressure chamber which is sealed off by an electrically conductive switching diaphragm facing in the direction of the tire. The chamber carries a contact pin interacting with this switching diaphragm, to close an electrical circuit in response to tire pressure and vehicle speed. Thus, this switch can set a minimum inflating pressure of a vehicle wheel to be monitored as a function of the vehicle speed.

This object, according to the invention, is obtained by having the switching diaphragm have a mass which is controlled as a function of the centrifugal force of the wheel such that the switching point of the pressure switch can be changed automatically. The switching points of the pressure switch form a characteristic curve as a function of the speed of the vehicle which sets a warning threshold for an excessively low tire pressure according to vehicle speed. The switching diaphragm of the pressure switch is arranged in a vertical transverse plane which extends approximately at a right angle with respect to the direction of force of the centrifugal force.

In order to vary the relationship with speed, the switching diaphragm has an accumulation of mass opposite the switching pin. This accumulation of mass can be located in a centric portion of the diaphragm; can be distributed uniformly over the circumference of the diaphragm; can consist of a thickened wall of the switching diaphragm; or can consist of a centrically arranged sleeve which is connected with the switching diaphragm and surrounds the free end of the contact pin.

The main advantages achieved by the invention consist of the fact that, as a result of the special construction of the switching diaphragm, the switching point of the pressure switch can be adapted to the minimum inflating pressure required for a given speed, by use of an accumulation of mass at the switching diaphragm whereby the enlarged surface mass produces a different switching over point in response to centrifugal force which increases with the vehicle speed. This centrifugal force causes a corresponding deflection movement of the switching diaphragm which results in an automatically changeable switching point as a function of the speed.

Other objects, advantages and novel features of the present invention will become apparent from the following detailed description of the invention when considered in conjunction with the accompanying drawings.

DETAILED DESCRIPTION OF THE DRAWINGS

Figure 1:
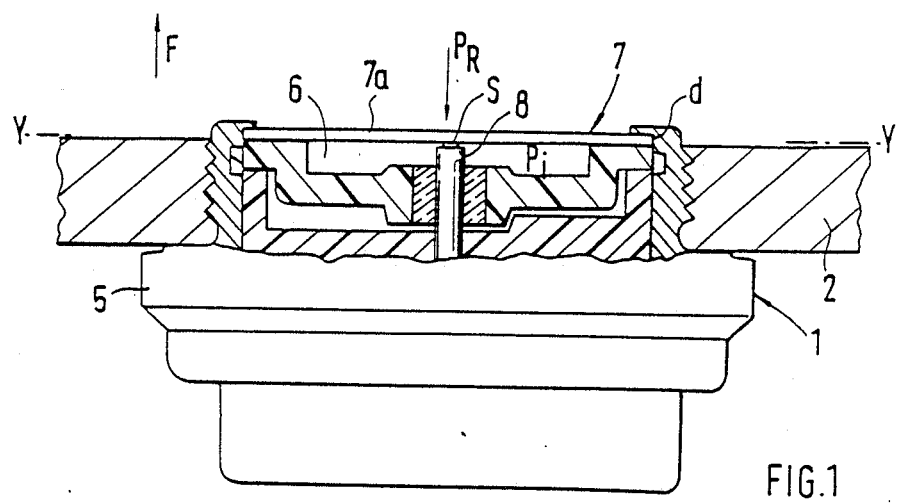
FIG. 1 is a partial sectional view of a pressure switch.

FIG. 1 shows a pressure switch 1 arranged at a wheel rim 2 in a sensor housing 5. The switch 1 comprises a pressure chamber 6, closed off by a switching diaphragm 7 which has a reference pressure $P_1$ therein and which is contrasted to the inflating pressure $P_R$ in the tire. Fastened in the center of the pressure chamber 6 is a contact pin 8 located in a pressure-sealed and electrically insulated manner. The switching diaphragm 7 and the contact pin 8 are arranged with respect to one another such that, when the inflating pressure PR in the vehicle tire is sufficiently above the reference pressure $P_1$, an electrical connection exists between them. In contrast, if the inflating pressure $P_R$ in the tire falls below the reference pressure $P_i$ in the pressure chamber 6, the switching diaphragm 7 lifts off the contact pin 8, and a warning display is triggered by an electric circuit or the like, which is not shown.

Figure 3:
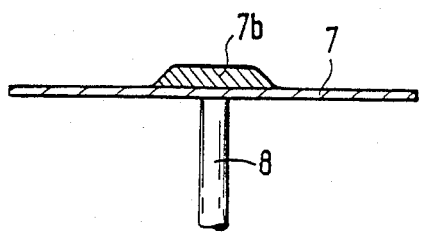
FIG. 3 is a representation of the switching diaphragm having a punctiform accumulation of mass.
Figure 4:
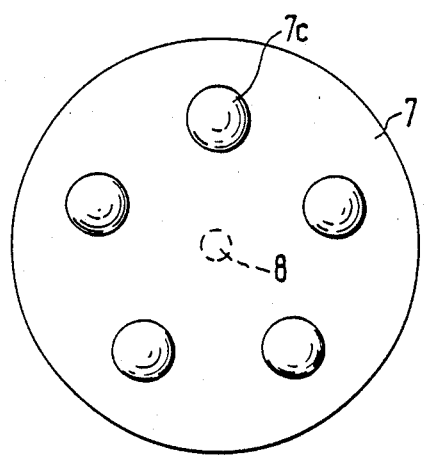
FIG. 4 is a top view of a switching diaphragm having accumulations of mass which are arranged to be distributed at the circumference.
Figure 5:
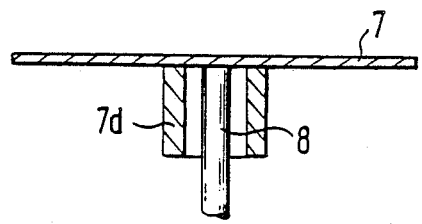
FIG. 5 is a sectional view of a switching diaphragm having a sleeve arranged on the inside which is the accumulation of mass.

The diaphragm 7 forms an element which automatically simulates the switching point S of the pressure switch 1 corresponding to the speed. For this purpose, the diaphragm 7 has an additional mass or a wall thickness (d) which is larger than that of the known switching diaphragm as shown in detail in FIG. 1 of German Patent Application No. DE-OS 35 43 864. As a result, a centrifugal force effect on the diaphragm 7 is increased as the vehicle tire rim 2 rotates. In particular, the switching diaphragm 7 has a uniform wall thickness (d) shown as 7a. However, it would also be conceivable to have a non-uniform wall thickness or an accumulation of mass 7b in the centric area of the diaphragm 7 (FIG. 3). This accumulation of mass 7b may consist of a punctiform mass or of a sleeve 7d (FIG. 5) which is arranged on the interior side of the diaphragm 7 and surrounds the switching pin 8 with a clearance. Likewise, an accumulation of mass 7c may be arranged to be uniformly distributed over the circumference of the diaphragm 7 (FIG. 4). In particular, the diaphragm 7 is arranged in a vertical transverse plane Y—Y which extends approximately perpendicularly with respect to the direction of force F of the centrifugal force.

Figure 2:
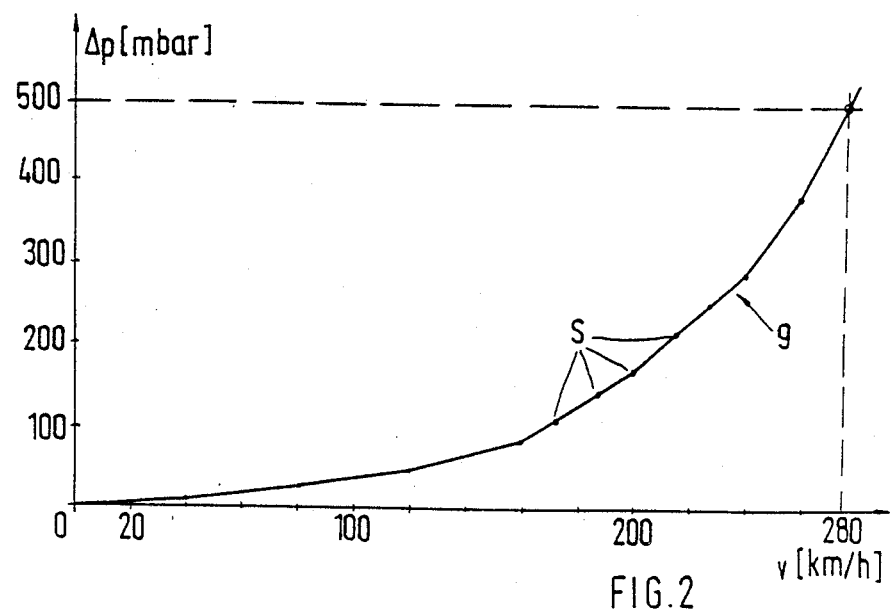
FIG. 2 is a diagram, which shows the influence of the centrifugal force on the switching diaphragm and the pressure switch.

As shown in the diagram according to FIG. 2, which shows the plotting of the switching point as a function of the driving speed of a vehicle, the switching point S of the pressure switch 1 can be adapted to the inflating pressure which is required for the tire at the respective speed. This means that the inflating pressure of the tire required for the respective speed of the tire can be monitored so that in the lower speed range, for example 160 km/h, an inflating pressure can be used that is approximately 0.5 bar lower than at maximum speed, $V_{max}=280$ km/h. The characteristic switching curve 9 as shown in the diagram in FIG. 2, is adapted to the minimum inflating pressure matching the respective speed. If the pressure in the tire is too low for the driven speed, a warning is triggered by the pressure switch 1.

The switching point of the pressure sensor can therefore be changed corresponding to the driven speed of the motor vehicle along characteristic curve 9, so that only one pressure switch 1 is required for different tire pressures and which can be simulated by the additional mass 7a; 7b; 7c; 7d of the switching diaphragm 7 which is controlled as a function of the centrifugal force.

For other applications or vehicles, the desired characteristic switching curves (Pschalt=f(V)) with corresponding pressure differences between the pressure at low and high speeds can be achieved as a function of: tire construction, tire dimension, wheel load, rim dimension, installed position of the switch (radial and angular position), diaphragm diameter, stiffness of the diaphragm, or by a corresponding increase of mass at the switching diaphragm, etc.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A pressure switch for monitoring tire pressure of motor vehicle tires, which is fastened at a wheel rim of the tire and is actuated by inflating pressure in the tire, comprising:
   a reference pressure chamber which faces in the direction of the tire and is sealed off from the tire by an electrically conductive switching diaphragm;
   the chamber supports a contact pin which interacts with this switching diaphragm to close an electric circuit between the pin and diaphragm; and
   the switching diaphragm has applied to it a force responsive to the tire pressure and a mass which is controlled as a function of centrifugal force indicative of tire rotational speed so that closing points of the pressure switch are determined by tire pressure that varies automatically with tire rotational speed.

2. A pressure switch according to claim 1, wherein closing points of the pressure switch, as a result of the rotational speed of the tire and hence speed of the vehicle, follow a desired characteristic speed curve which provides a warning threshold for an excessively low tire pressure that increases as vehicle speed increases.

3. A pressure switch according to claim 1, wherein the switching diaphragm of the pressure switch is arranged in a vertical transverse plane which extends approximately at a right angle with respect to a direction of force of the centrifugal force.

4. A pressure switch according to claim 2, wherein the switching diaphragm of the pressure switch is arranged in a vertical transverse plane which extends approximately at a right angle with respect to the direction of force of the centrifugal force.

5. A pressure switch according to claim 1, wherein the switching diaphragm has a centric accumulation of mass opposite the switching pin.

6. A pressure switch according to claim 2, wherein the switching diaphragm has a centric accumulation of mass opposite the switching pin.

7. A pressure switch according to claim 3, wherein the switching diaphragm has a centric accumulation of mass opposite the switching pin.

8. A pressure switch according to claim 4, wherein the switching diaphragm has a centric accumulation of mass opposite the switching pin.

9. A pressure switch according to claim 1, wherein the switching diaphragm has an accumulation of mass distributed uniformly over the circumference thereof.

10. A pressure switch according to claim 2, wherein the switching diaphragm has an accumulation of mass distributed uniformly over the circumference thereof.

11. A pressure switch according to claim 3, wherein the switching diaphragm has an accumulation of mass distributed uniformly over the circumference thereof.

12. A pressure switch according to claim 4, wherein the switching diaphragm has an accumulation of mass distributed uniformly over the circumference thereof.

13. A pressure switch according to claim 1, wherein the switching diaphragm has an accumulation of mass which consists of a thickened wall of the switching diaphragm which thickness is set to produce a desired vehicle speed-tire pressure relationship.

14. A pressure switch according to claim 2, wherein the switching diaphragm has an accumulation of mass which consists of a thickened wall of the switching diaphragm which thickness is set to produce a desired vehicle speed-tire pressure relationship.

15. A pressure switch according to claim 3, wherein the switching diaphragm has an accumulation of mass which consists of a thickened wall of the switching diaphragm which thickness is set to produce a desired vehicle speed-tire pressure relationship.

16. A pressure switch according to claim 4, wherein the switching diaphragm has an accumulation of mass which consists of a thickened wall of the switching diaphragm which thickness is set to produce a desired vehicle speed-tire pressure relationship.

17. A pressure switch according to claim 1, wherein the switching diaphragm has an accumulation of mass provided by a centrically arranged sleeve which is connected with the switching diaphragm and surrounds a free end of the contact pin.

18. A pressure switch according to claim 2, wherein the switching diaphragm has an accumulation of mass provided by a centrically arranged sleeve which is connected with the switching diaphragm and surrounds a free end of the contact pin.

19. A pressure switch according to claim 3, wherein the switching diaphragm has an accumulation of mass provided by a centrically arranged sleeve which is connected with the switching diaphragm and surrounds a free end of the contact pin.

20. A pressure switch according to claim 4, wherein the switching diaphragm has an accumulation of mass provided by a centrically arranged sleeve which is connected with the switching diaphragm and surrounds a free end of the contact pin.

* * * * *